Feb. 15, 1955    N. E. ANDERSON    2,702,333
ARC WELDING APPARATUS
Filed March 22, 1951    2 Sheets-Sheet 1
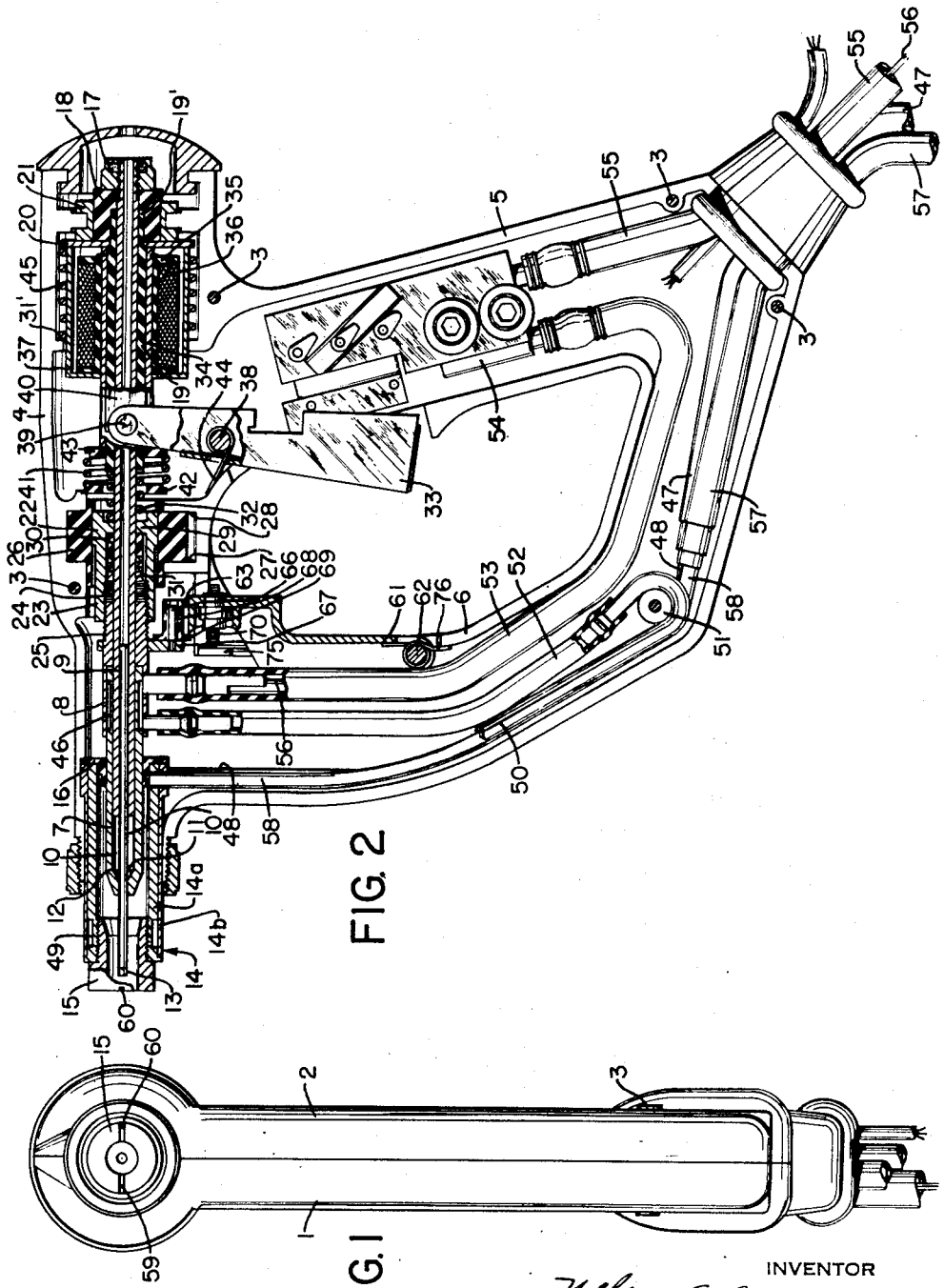
INVENTOR
Nelson E. Anderson
By Pennie Edmunds Morton Barrows & Taylor
ATTORNEYS United States Patent Office 2,702,333
Patented Feb. 15, 1955

2,702,333
ARC WELDING APPARATUS

Nelson E. Anderson, Berkeley Heights, N. J., assignor to Air Reduction Company, Incorporated, a corporation of New York Application March 22, 1951, Serial No. 216,961

14 Claims. (Cl. 219—15)

This invention relates to arc welding apparatus and more particularly to portable apparatus by which arc spot welding may be performed.

My copending application Serial No. 41,527, filed July 30, 1948, now U. S. Patent 2,586,140 granted Feb. 19, 1952, discloses and claims an arc welding gun having a barrel, and a pistol grip provided with a trigger, and means operating when the trigger is pulled for advancing an electrode holder in the barrel to bring the end of a non-consuming electrode gripped in the holder into contact with the work. When the electrode contacts with the work the electrode holder is automatically retracted to the limit of its rearward movement to establish the welding arc. The end of the barrel has a nozzle attached to it through which an inert shielding gas such as argon or helium is discharged to shield the tip of the electrode, the arc, and the weld puddle. The end of the nozzle is held against the work at the place where a spot weld is desired, and the trigger is then pulled to advance the electrode holder and initiate the sequence of operations which produce the weld.

In the welding gun disclosed in the aforesaid copending application the means for advancing the electrode holder when the trigger is pulled, and the means for retracting the electrode holder to establish the welding arc, comprise a mechanical latch which functions when the trigger is pulled to advance the electrode holder until the electrode contacts with the work, and an electromagnetic device which is energized by the welding current when the electrode contacts the work and which then trips the latch to permit a spring to retract the electrode holder to the limit of its rearward movement.

The present invention relates to improvements in the type of welding gun disclosed in the copending application, the improvements being also applicable to certain kinds of arc welding apparatus when not used for spot welding. The improvements pertain to the means for advancing the electrode holder when the trigger is pulled and for retracting the electrode holder to establish the arc when the electrode contacts with the work. In place of the above-described mechanical latch and its electromagnetic tripping device, the present invention contemplates the use of an electro-magnetic coupling between the trigger and the electrode holder, the coil of the coupling being energized under open circuit conditions when the welding generator is running to thereby produce a magnetic attraction between the two parts of the coupling. One part of the coupling is operatively connected with the trigger and the other part is operatively connected with the electrode holder so that unless the coil of the coupling is energized, pulling the trigger will move the first part of the coupling without moving the second part and hence without moving the electrode holder, but when the coil of the coupling is energized the two parts will be magnetically attracted to each other such that pulling the trigger will cause advancement of the electrode holder. When the electrode contacts with the work the coil of the coupling is automatically de-energized thus uncoupling the two parts of the coupling and permitting spring means to return the electrode holder to the limit of its rearward movement.

The invention contemplates certain other features relating to the electro-magnetic coupling such as means for rendering the coupling ineffective to advance the electrode holder when the trigger is pulled unless the shielding gas and cooling water are flowing to the welding gun before the trigger is pulled, and also means for insuring quick uncoupling of the parts of the electro-magnetic coupling when the electrode contacts with the work.

A welding gun embodying the invention is illustrated in the accompanying drawing in which:

Figure 1 is an end elevation of the gun looking toward the nozzle end thereof,

Fig. 2 is a side elevation of the gun with the nearest half of the casing removed to expose the interior parts, the interior parts being shown partly in vertical section and partly in side elevation.

Figure 3:
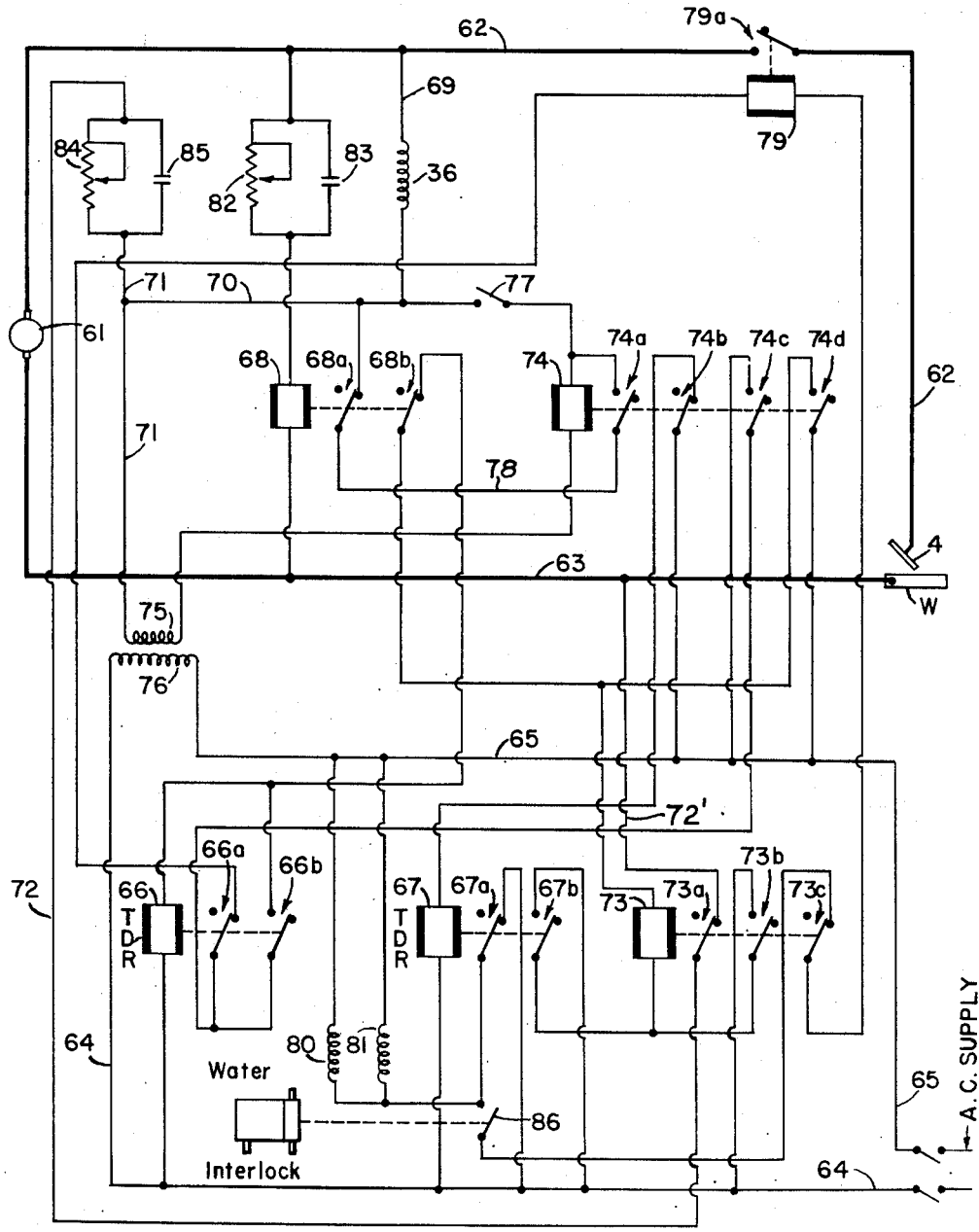
Fig. 3 is a simplified wiring diagram of the electrical system showing the welding circuit, the control circuit, and the various electrical instrumentalities connected in them.

The welding gun may comprise a casing which is divided longitudinally to form two casing halves shown at 1 and 2 in Fig. 1. These halves are secured together by means of screws 3. The casing then forms a barrel portion 4, a pistol grip portion 5, and a hollow branch portion 6 through which the cooling water and gas conduits and the welding conductor pass as hereinafter described. It will be understood that in Fig. 2 the nearest half of the casing has been removed to expose the interior parts of the welding gun.

The electrode holder is mounted to slide in the barrel 4 and comprises an outer tube made up of forward and rear sections 7 and 8 and an inner electrode carrier tube 9 having limited sliding movement relative to the outer tube and the forward end of which is slotted longitudinally throughout a short distance to form a number of resilient electrode gripping jaws 10. The forward ends of these jaws are externally beveled as shown at 11 and cooperate with an internal conical surface 12 near the forward end of the section 7 of the outer tube such that when the two tubes are relatively moved into greater telescoping relation the resilient jaws 10 are forced inwardly into gripping engagement with a non-consuming electrode 13 of tungsten or the like carried by the inner tube, and when the two tubes are relatively moved in the opposite direction the grip of the resilient jaws on the electrode is released. Thus the forward end of the outer tube and the resilient jaws on the inner tube constitute a chuck for gripping the electrode. The means for relatively moving the inner and outer tubes to grip and release the electrode will be described later.

At its forward end the electrode holder projects into a nozzle 14 stationarily mounted in the gun casing. Screwed into the forward end of the nozzle 14 there is a removable and replaceable nozzle tip or work-contacting member 15 which constitutes in effect a continuation of the nozzle. A bushing 16 made of electric insulating material located at the rear end of the nozzle forms a slide bearing for the outer tube 7—8 of the electrode holder and also provides a gas seal at the rear end of the nozzle. The electrode carrier tube 9 projects rearwardly out of the outer tube 7—8 and is threaded at its rear end to receive an elastic stop nut 17. This nut retains an insulating bushing 18 on the end of the tube 9. A sleeve 19 made of insulating material is slidably mounted on the rear portion of the tube 9, and has a portion 19' of reduced diameter at its rear end which partly telescopes within the bushing 18 as shown. A disc 20 of magnetic material has a slide fit on the portion 19' of the sleeve 19 and in the normal position of the parts abuts at one side against the forward face of the bushing 18 and at its other side against the shoulder existing on the sleeve 19 by reason of the provision of the reduced-diameter portion 19'. The bushing 18 slides in a bearing sleeve 21 held stationary by the gun casing.

The means for relatively moving the inner and outer tubes of the electrode holder to operate the chuck to grip or release the electrode includes a chuck-operating nut 22 having a forwardly extending sleeve portion 23 which is internally threaded as shown at 24. These internal threads cooperate with external threads 25 on the rear end of the section 8 of the outer tube. The nut 22 is slidable within the central opening of a knurled knob 26 made of insulating material, the nut being splined in the knob so that when the knob is turned rotation will also be imparted to the nut. The splining may be effected by giving the nut a square or other irregular cross-section and shaping the central opening in the knob 26 accordingly. The knob 26 is held against all movement, except rotary movement, by shoulders 27 and 28 on the gun casing. The knob projects through openings in the side walls of the gun casing so that it may be turned by hand. The nut 22 has a portion 29 which projects radially inward toward the inner tube 9 of the electrode holder. When the nut 22 is turned in a clockwise direction by the knob 26 the radially extending portion 29 on the nut exerts a forward pressure against the tube 9 through a rubber sleeve 30 and a nut or shoulder 31 fixedly carried by the tube 9. This tends to retract the outer tube 7—8 of the electrode holder and tends to move the inner tube 9 of the holder forwardly thus causing the conical surface 12 in the outer tube to have a cam action on the beveled ends of the resilient jaws 10 which forces the resilient jaws inwardly to grip the electrode. When the nut 22 is turned in the opposite direction by the knob 26 pressure is exerted on the outer tube 7—8 of the electrode holder in a forward direction, and on the inner tube 9 in a rearward direction through a coil spring 32 located between the nut 22 and the forward end of the insulating sleeve 19. Thus, rotation of the knob 26 in this direction permits the resilient jaws 10 to release their grip on the electrode. The principal function of the coil spring 32 will be described later.

With the electrode properly gripped in the electrode holder, and with the nozzle tip held against the work, the electrode holder is advanced to bring the electrode into contact with the work by pulling a trigger 33. A brief interval after the electrode touches the work the electrode holder is automatically retracted to establish the arc. The means employed for advancing the electrode holder when the trigger is pulled and for retracting the electrode holder after the electrode contacts with the work will now be described.

Slidably mounted on the insulating sleeve 19 is a metal sleeve 34 to which there is secured a spool 35 of insulating material. This spool has wound on it a coil of insulated wire 36. A casing or housing 37 secured to the metal sleeve 34 encloses the wire coil 36. The coil housing 37 is open at its rear end except when in abutting relation with the disc 20. These parts, i. e., the metal sleeve 34, spool 35, coil 36, and coil housing 37, constitute a so-called coil assembly. Energization of the coil 36 produces a magnetic field which causes the disc 20, then acting as an armature, to move forwardly with the coil assembly when the coil assembly is moved forward by the trigger 33 as hereinafter described, and the forward movement of the armature 20 advances the electrode holder in a manner also to be later described.

The trigger 33 is pivoted intermediate its ends in the casing at 38. Thus, as the lower end of the trigger is pulled, i. e., moved to the right in Fig. 2, the upper end moves to the left or in a forward direction. The trigger is bifurcated at its upper end to straddle the sleeve 34 of the coil assembly and each of the straddling arms has a pin 39 which projects inwardly into a flat 40 formed in the side of the sleeve 34. When the trigger is pulled, each of the two pins 39 engages the shoulder existing at the forward terminus of the corresponding flat 40 and hence the upper end of the trigger in moving forwardly moves with it the entire coil assembly. This movement of the coil assembly is in opposition to the action of a return spring 41 which biases the coil assembly to its normal position shown in the drawing. The spring 41 bears at its forward end against a retainer ring 42 held in fixed position by the gun casing, and at its rear end against retainer ring 43 which abuts against the forward end of the sleeve 34 of the coil assembly. A spring 44 yieldingly maintains the trigger 33 in its normal position, i. e., the position shown in the drawing.

As will be clear from the circuit diagram hereinafter described, when the welding generator is running and under open circuit conditions, the coil 36 of the electromagnetic coupling is energized and therefore when the coil assembly 34—37 is moved forwardly by pulling the trigger the disc or armature 20, now being magnetically attracted to the coil assembly by the magnetic field produced by the coil, is caused to move forwardly along with the coil assembly. The armature 20 moves along with it the insulating sleeve 19 and this sleeve through the spring 32 moves the chuck-operating nut 22 which in turn moves the outer tube 7—8 of the electrode holder. The nut 22 also moves the electrode carrier tube 9 through the rubber sleeve 30 and shoulder 31 on this tube. Thus, the electrode carrier tube 9 and bushing 18 at its rear end are now moving in unison with the insulating sleeve 19 and the armature 20 and all the parts except the bearing 21 move together. During this movement of the parts the bushing 18 slides in the bearing 21. By the means hereinafter described the coil 36 of the electromagnetic coupling is automatically de-energized when the electrode makes contact with the work and this permits a coil spring 45, which surrounds the coil housing 37 and which bears at its rear end against the armature disc 20 and at its forward end against a shoulder 31' on the gun casing, to return the armature to normal position. This retracts the electrode holder and establishes the arc because in moving rearwardly the armature disc 20 moves with it the bushing 18, nut 17, and the electrode carrier tube 9. The shoulder 31 on the electrode carrier tube, the rubber sleeve 30, and the chuck-operating nut 22, cause the outer tube 7—8 of the electrode holder to move rearwardly with the electrode carrier tube.

In the retracted position of the electrode holder the armature disc 20 abuts against the bearing sleeve 21. This bearing sleeve therefore constitutes a stop which definitely fixes the amount that the electrode holder can move rearwardly.

When the electrode holder is advanced to establish the arc there is a brief interval of time after the electrode touches the work before the hereinafter described relays in the electric circuits have time to function and cause retraction of the electrode holder. If the operator continues to pull on the trigger 33 during this interval of time then if it were not for the spring 32 the further advancement of the armature 19 by the electromagnetic coupling and a continued pressure of the electrode against the work would be likely to push the gun back thus moving the nozzle tip 15 out of contact with the work, or the continued forward movement of the outer tube 7—8 of the electrode holder while the electrode is held stationary would be likely to shift the point at which the resilient jaws 10 grip the electrode. However, during this brief interval of time while the electrode is in contact with the work the spring 32 yields if the operator continues to pull on the trigger thus allowing continued movement of the coil assembly, armature 20 and insulating sleeve 19, while the electrode and the two tubes of the electrode holder remain stationary, the insulating sleeve 19 then sliding on and relative to the electrode carrier tube 9. When the armature 20 is released from the coil assembly by de-energization of the coil 36 and moves to its rearward position to establish the arc, as above described, the spring 32 returns the sleeve 19 to its rearward position. When the trigger is released the spring 41 returns the coil assembly to its rearward position and during this movement of the coil assembly the tube 34 thereof slides on the insulating sleeve 19.

It will thus be seen that the coil assembly 34—37 and the disc 20 constitute an electro-magnet coupling between the trigger and the electrode holder, the coil assembly being the field part of the electro-magnetic coupling and the disc 20 being the armature part. The electro-magnetic coupling when energized renders the trigger operable to advance the electrode holder and when de-energized breaks the coupling and permits the spring means to retract the electrode holder to the limit of its rearward movement if the trigger has previously advanced the electrode holder, or prevents the trigger when pulled from advancing the electrode holder if the coupling is de-energized at the time the trigger is pulled or immediately upon pulling the trigger.

If desired, the armature of the electro-magnetic coupling could be operatively connected to the trigger, and the field part of the coupling could be operatively connected to the electrode holder, the armature then being arranged to pull along the field part when the trigger is pulled and the coupling is energized.

The forward end portion of the rear section 8 of the outer tube of the electrode holder telescopes over the rear end portion of the forward section of this tube, and the portion of the forward section that lies within the rear section is provided with an annular recess 46 which forms a cooling chamber. Cooling water is supplied to the welding gun by means of a hose 47 which is connected to a tube 48 that extends through the branch portion 6 of the gun casing to the rear end of the nozzle 14. The nozzle is made up of an inner tube 14a and an outer sleeve 14b, the inner tube having on its outer surface a pair of longitudinally extending diametrically opposite flats (which do not appear in the drawing because of the plane in which the section of Fig. 2 is taken). These flats form with the outer sleeve 14b two longitudinal water passages which are placed in communication at the forward end of the nozzle by an annular recess 49 also formed in the outer surface of the inner tube 14a and which is covered by the outer sleeve 14b. Water is admitted by the tube 48 to the rear end of one of the longitudinal passages and flows forwardly, then around the annular passage 49, and back through the other longitudinal passage from which it is discharged into a tube 50. This tube bends around a stud 51 and then connects with a flexible hose 52 which conducts the water to the above-described cooling chamber 46 on the electrode holder. The water leaves this chamber through a flexible hose 53 which conducts it to a junction box, and a flexible hose 55 leading from this junction box discharges the water from the welding gun. The conductor 56 for the welding current, preferably in the form of a metal braid, may pass through the water exit hoses 55 and 53 to the place where it is connected to the electrode holder. The reason for conducting the cooling water from the nozzle 14 to the cooling chamber 46 in the electrode holder by a conduit that extends down to and around the stud 51 is to provide a flexible portion of considerable length in this conduit (the hose 52) which along with the flexible hose 53 permits the necessary movement of the electrode holder in the gun barrel.

Shielding gas is supplied to the welding gun through a hose 57 which is connected to a tube 58 that extends through the branch 6 of the gun casing and opens into the nozzle 14. When the nozzle tip 15 is in contact with the work the gas is discharged from the nozzle to the atmosphere through recesses 59 and 60 (Fig. 1) in the work-contacting face of the nozzle tip.

There is shown at 33a an auxiliary trigger which forms no part of the present invention but it is fully described and claimed in the copending application of Joseph M. Tyrner, Serial No. 216,935, filed March 22, 1951, now U. S. Patent 2,628,302 granted February 10, 1953, and assigned to the same assignee as the present application. Its use facilitates adjustment of the electrode in the electrode holder to produce an arc gap of the desired length. When the auxiliary trigger is moved to the limit of its movement it advances the electrode holder a distance equal to the desired length of the arc gap. Therefore when it is operated while the tip of the nozzle is held against the work and the electrode is then adjusted in the holder until it contacts with the work it will produce an arc gap of the desired length when the electrode holder is moved to its fully retracted position.

Fig. 3 is a simplified wiring diagram showing the welding and control circuits. A generator or other source of welding current 61 is electrically connected to the electrode 4 and the work W by means of conductors 62 and 63. The control circuit has its independent source of voltage such as a 115 volt 60 cycle power line. The conductor represented at 64 is connected to one side of this voltage source, and the conductor represented at 65 is connected to the opposite side thereof. Connected across these conductors is the operating coil 66 of a time delay relay or weld timer which controls the length of the welding period. This relay controls two pairs of contacts—a normally closed pair 66a and a normally open pair 66b. Also connected across the conductors 64 and 65 is a second time delay relay 67 which controls the length of time that the shielding gas and the cooling water will flow to the welding gun, the relay being set to cause the gas and water to continue flowing for a predetermined interval of time beyond the end of the welding period. This relay has a pair of normally closed contacts 67a and a pair of normally open contacts 67b.

Referring again to the welding circuit, there is connected across the conductors 62 and 63 the operating coil 68 of a relay which controls the start of the weld timer, i. e., controls the energization of the coil of the time delay relay 66. This relay has two pairs of normally closed contacts 68a and 68b. The coil 36 of the electro-magnetic coupling between the trigger and the electrode holder is connected across the conductor 62 and 63 of the welding circuit by means of conductors 69, 70, 71, 72 and 72'. Connected in series with the coil 36 is a pair of normally closed relay contacts 73a controlled by a relay 73. This relay additionally controls a pair of normally open contacts 73b and a pair of normally closed contacts 73c. The operating coil 74 of a relay is connected in series with the secondary winding 75 of a transformer the primary winding 76 of which is connected across the conductors 64 and 65 of the control circuit. The relay coil 74 is also connected in series with a trigger switch 77 which is associated with the trigger and is closed as soon as the trigger is pulled. The conductors 70 and 71 connect the secondary 75 of the transformer, the relay coil 74, and the trigger switch 77 in a closed circuit so that when the trigger switch is closed the relay coil 74 is energized by the secondary winding of the transformer. The relay 74 has four pairs of contacts—a normally open pair 74a, a normally closed pair 74b, a normally open pair 74c, and a normally open pair 74d. The pair of contacts 74a of the relay 74 and the pair of contacts 68a of the relay 68 are connected in series across the trigger switch 77 by a conductor 78. Connected in series with the welding generator in one of the main conductors of the welding circuit are the contacts 79a of the welding contactor.

The operating coil 79 of the welding contactor is connected across the conductors 64 and 65 of the control circuit in series with the pair of contacts 67a of the time delay relay 67, and also in series with the pairs of relay contacts 73c, 66a and 74c. Contacts 67b of the time delay relay 67 are connected in the control circuit in series with the operating coil of the above-mentioned relay 73. The contacts 73b, shunted around the contacts 67b and controlled by the relay 73 constitute lock-in contacts for this relay. The relay 73 prevents closing of the welding contactor and prevents the magnetic coupling from advancing the electrode holder when the trigger is pulled if the shielding gas and cooling water are not flowing to the welding gun prior to pulling the trigger, and for this reason its normally closed contacts 73c are connected in series with the operating coil 79 of the welding contactor, and as above stated its normally closed contacts 73a are connected in the welding circuit in series with the coil 36 of the magnetic coupling. The normally closed contacts 67a of the time delay relay 67 are connected in series with the operating coil 80 of a solenoid valve which controls the flow of shielding gas to the welding gun, and also in series with the operating coil 81 of a solenoid valve which controls the flow of cooling water to the gun, these two coils and the relay contacts 67a which control them, being connected across the conductors 64 and 65 of the control circuit.

As above stated the relay 68 whose operating coil is connected across the welding circuit controls the start of the weld timer and for this purpose its pair of normally closed contacts 68b are connected in series with the operating coil 66 of the weld timer.

The contacts 74b of relay 74 are connected in the control circuit in series with the time delay relay 67, and the contacts 74d of this relay are connected in series with the operating coil of the relay 73.

Connected in series with the operating coil of the relay 68 in the welding circuit is an R. C. circuit including a resistance 82 and a condenser 83. The purpose of this R. C. circuit is to cause quick de-energization of the operating coil of the relay 68 so as to obtain quick response of the relay when the electrode touches the work. The condenser is charged during open circuit voltage after the welding generator is started, and when the operating coil of the relay is short-circuited by the electrode touching the work the condenser discharges and provides energy in opposition to the self-induced energy in the relay coil produced by the decaying flux and which would otherwise prolong the flow of current in the relay coil and cause a delay in the dropping out of the relay.

There is a similar R. C. circuit connected in series with the coil 36 of the electro-magnetic coupling, the resistance and condenser of this R. C. circuit being shown at 84 and 85, respectively. This R. C. circuit causes quick uncoupling of the electro-magnetic coupling upon the electrode contacts with the work whereby the electrode holder is retracted to establish the arc immediately after the electrode touches the work. The condenser 85 is charged when the coil 36 of the electro-magnetic coupling is energized, and when the electrode is brought into contact with the work and the coil 36 is thus deenergized the condenser discharges and provides energy in opposition to the self-induced energy in the coil produced by the decaying flux and which would otherwise tend to delay the uncoupling of the electro-magnetic coupling. Preferably the resistance 84 and the condenser 85 are given such values that there is actually a reverse flow of current in the coil 36 when the coil is de-energized by the electrode touching the work. This reverse flow of current neutralizes or eliminates the residual magnetism in the magnetic material of the coupling and thereby insures even quicker uncoupling of the parts of the coupling. This result has been satisfactorily attained by the use of a 2,000 ohm 10 watt resistance and a 20 mfd. condenser.

The contacts 86 of a water interlock are connected in series with the operating coil 79 of the welding contactor. The water interlock may be of any suitable type which is sensitive to the quantity of water supplied to the torch so that a quantity of water in excess of a predetermined amount will cause the contacts 86 to close and permit energization of the welding contactor coil 79 when the trigger is pulled as hereinafter described, and thereby allow normal operation of the total control, and so that when the quantity of water flowing is less than such predetermined amount, the contacts 86 will be open to prevent energization of the welding contactor coil when the trigger is pulled.

When the welding generator is turned on, relay 68 pulls in causing its normally closed contacts 68a and 68b to open. The coil 36 of the electro-magnetic coupling is also energized.

When power is applied to the conductors 64 and 65 of the control circuit by closing the line switch, time delay relay 67 is energized through the normally closed contacts 74b of relay 74 and starts to time out. The coils 80 and 81 of the gas and water solenoid valves are energized through the normally closed contacts 67a of the time delay relay 67 and thus gas and water will flow to the welding gun until this relay has timed out thereby opening the contacts 67a and de-energizing the coils 80 and 81 of the gas and water solenoid valves.

If the trigger is pulled to start a weld before time delay relay 67 times out, the weld cycle will start, but if this time delay relay has timed out before the trigger is pulled, two pulls of the trigger are necessary to start the weld cycle. Whenever the trigger is pulled relay 74 always pulls in. If time delay relay 67 has timed out thereby closing the normally open contacts 67b, the first pull of the trigger energizes relay 73 because the contacts 74d will also be closed. This opens the normally closed contacts 73c thus preventing energization of the welding contactor 79 and the closing of its contacts 79a, and opens normally closed contacts 73a thus causing de-energization of the coil 36 of the electro-magnetic coupling and thereby rendering the coupling ineffective. It also starts the flow of shielding gas and cooling water by opening the normally closed relay contacts 74b thus de-energizing time delay relay 67. This causes the relay contacts 67a to close thus energizing the coils 80 and 81 of the gas and water solenoid valves, and also causes relay contacts 67b to open. However, relay 73 has locked itself in around the contacts 67b by the closing of contacts 73b and therefore relay 73 will stay energized until the trigger is released thus de-energizing relay 74 and opening its contacts 74d. The opening of the contacts 74d upon release of the trigger de-energizes relay 73 so that its contacts 73a again close to thereby re-energize coil 36 of the magnetic coupling and so that its contacts 73c again close to permit energization of the coil 79 of the welding contactor upon the next pull of the trigger. The next pull of the trigger will start the weld cycle.

With gas and water flowing to the welding gun, pulling the trigger energizes relay 74 which keeps the gas and water flowing by opening its normally closed contacts 74b, and it energizes the welding contactor 79 through the relay contacts 74c (provided there is sufficient cooling water flowing to cause the contacts 86 of the water interlock to be closed). Pulling the trigger also moves the electrode into contact with the work since the coil 36 of the magnetic coupling is energized, thus short-circuiting the welding generator to cause relay 68 to drop out thereby energizing the weld timer 66 through the normally closed contacts 68b and the closed contacts 74d of relay 74. It also de-energizes the coil 36 of the electro-magnetic coupling thus causing the electrode to be retracted quickly from the work to establish the arc. If the quantity of cooling water flowing to the torch is insufficient to satisfactorily cool the torch the water interlock contacts 86 will be open thus preventing energization of the welding contactor 79 when the trigger is pulled and thereby preventing the establishment of the welding arc.

At the end of the preset time, the weld timer or time delay relay 66 times out thus de-energizing the welding contactor 79 and terminating the welding period by opening contacts 66a. Timing out of the time delay relay 66 also closes its normally open contacts 66b which keep the coil of this time delay relay energized as long as the trigger is pulled, thus preventing recycling of the weld timer 66. Gas and water will continue to flow to the welding gun until the time delay relay 67 times out at the end of its preset time.

As soon as relay 68 has dropped out, as above described, the trigger may be released without affecting the normal welding cycle. The relay contacts 74a and 68a, which are now closed, insure this by locking the winding of the relay 74 in a closed circuit including the secondary 75 of the transformer, the conductor 70 and the conductor 78. At the end of the welding period the voltage through the relay winding 68 increases sufficiently to cause this relay to pull in thus opening its contacts 68a and thereby de-energizing the coil of relay 74.

I claim:

1. In arc welding apparatus, an electrode holder, an electrode gripped by the holder and projecting from the forward end thereof, a welding circuit in which the electrode and the work may be connected whereby a welding arc may be established between the electrode and the work, a support for the electrode holder relative to which the holder is longitudinally movable, and means for advancing the electrode holder to bring the tip of the electrode into contact with the work and for retracting it to a predetermined rearward position to establish a welding arc, said means including an electro-magnetic coupling having one part provided with a magnetizing coil and another part made of magnetic material and constituting an armature, a source of electrical energy for energizing said coil, one of said parts of the coupling being movable longitudinally of and relative to the electrode holder, manually operable means for advancing such part from its normal position, the other or second part of the coupling being operatively connected with the electrode holder and when said coil is energized being magnetically attracted to the first part and movable from its normal position therewith to thereby advance the electrode holder, said coil being connected in the welding circuit so that it is de-energized when the electrode contacts with the work, spring means for then moving said second part of the coupling rearwardly to its normal position to thereby retract the electrode holder to said predetermined rearward position, and spring means for returning the first part of the coupling to its normal position when permitted to do so by said manually operable means.

2. In arc welding apparatus, an electrode holder, an electrode gripped by the holder and projecting from the forward end thereof, a welding circuit in which the electrode and the work may be connected whereby a welding arc may be established between the electrode and the work, a support for the electrode holder relative to which the holder is longitudinally movable, and means for advancing the electrode holder to bring the tip of the electrode into contact with the work and for retracting it to a predetermined rearward position to establish a welding arc, said means including an electro-magnetic coupling having a field part provided with a magnetizing coil and another part made of magnetic material and constituting an armature, a source of electrical energy for energizing said coil, said field part of the coupling being movable longitudinally of and relative to the electrode holder and said armature being operatively connected with the electrode holder, manually operable means for advancing the field part of the coupling from its normal position, the armature when said coil is energized being magnetically attracted to the field part and movable from its normal position therewith to thereby advance the electrode holder, said coil being connected in the welding circuit so that it is de-energized when the electrode contacts with the work, spring means for then moving the armature rearwardly to its normal position to thereby retract the electrode holder to said predetermined rearward position, and spring means for returning the field part of the coupling to its normal position when permitted to do so by said manually operable means.

3. In arc welding apparatus, an electrode holder, an electrode gripped by the holder and projecting from the forward end thereof, a welding circuit in which the electrode and the work may be connected whereby a welding arc may be established between the electrode and the work, a support for the electrode holder relative to which the electrode holder is longitudinally movable, stop means limiting the rearward movement of the electrode holder relative to the support, spring means normally biasing the electrode holder to the limit of its rearward movement, said support serving when in welding position and when the electrode holder is in its rearward position to hold the tip of the electrode spaced from the work to form an arc gap, and means for advancing the electrode holder relative to the support to bring the tip of the electrode into contact with the work, said means including an electro-magnet coupling having one part provided with a magnetizing coil and another part made of magnetic material and constituting an armature, a source of electrical energy for energizing said coil, one of said parts of the coupling being movable longitudinally of and relative to the electrode holder, manually operable means for advancing such part from its normal position, the other or second part of the coupling being operatively connected with the electrode holder and when said coil is energized being magnetically attracted to the first part and movable from its normal position therewith to thereby advance the electrode holder, said coil being connected in the welding circuit so that it is de-energized when the electrode contacts with the work whereby said spring means then retracts the electrode holder to the limit of its rearward movement, and spring means for returning the first part of the coupling to its normal position when permitted to do so by said manually operable means.

4. In arc welding apparatus, an electrode holder, an electrode gripped by the holder and projecting from the forward end thereof, a welding circuit in which the electrode and the work may be connected whereby a welding arc may be established between the electrode and the work, a support for the electrode holder relative to which the holder is longitudinally movable, stop means limiting the rearward movement of the electrode holder relative to the support, spring means normally biasing the electrode holder to the limit of its rearward movement, said support serving when in welding position and when the electrode holder is in its rearward position to hold the tip of the electrode spaced from the work to form an arc gap, and means for advancing the electrode holder relative to the support to bring the tip of the electrode into contact with the work, said means including a hand lever and an electro-magnetic coupling between the hand lever and the electrode holder and which when energized renders the hand lever operative to advance the electrode holder and which when de-energized breaks the coupling and permits said spring means to retract the electrode holder to the limit of its rearward movement, and means for energizing said coupling, the coupling being connected in the welding circuit so that it is de-energized when the electrode contacts with the work.

5. In apparatus for arc spot welding, an electrode holder, an electrode gripped by the holder and projecting from the forward end thereof, a welding circuit in which the electrode and the work may be connected whereby a welding arc may be established between the electrode and the work, a support for the electrode holder relative to which the holder is longitudinally movable and having an end to be held against the work during a welding operation, stop means limiting the rearward movement of the electrode holder relative to the support, spring means normally biasing the electrode holder to the limit of its rearward movement, and means for advancing the electrode holder relative to the support to bring the tip of the electrode into contact with the work, said means including a hand lever and an electro-magnetic coupling between the hand lever and the electrode holder and which when energized renders the hand lever operative to advance the electrode holder and which when de-energized breaks the coupling and permits said spring means to retract the electrode holder to the limit of its rearward movement, and means for energizing said coupling, the coupling being connected in the welding circuit so that it is de-energized when the electrode contacts with the work.

6. In apparatus for arc spot welding, a barrel, a pistol grip connected to the barrel, an electrode holder slidably mounted in the barrel, an electrode gripped by the holder and projecting from the forward end thereof, a welding circuit in which the electrode and the work may be connected whereby a welding arc may be established between the electrode and the work, stop means limiting the rearward movement of the electrode holder in the barrel, spring means normally biasing the electrode holder to the limit of its rearward movement, said barrel having a nozzle attached to it the tip of which may be held against the work during a welding operation and then serving to hold the tip of the electrode spaced from the work to form an arc gap when the electrode holder is in its rearward position, and means for advancing the electrode holder in the barrel to bring the tip of the electrode into contact with the work when the tip of the nozzle is held against the work, said means including a trigger on the pistol grip and an electro-magnetic coupling between the trigger and the electrode holder and which when energized renders the trigger operative to advance the electrode holder and which when de-energized breaks the coupling and permits said spring means to retract the electrode holder to the limit of its rearward movement, and means for energizing said coupling, the coupling being connected in the welding circuit so that it is de-energized when the electrode contacts with the work.

7. In arc welding apparatus, an electrode holder, an electrode gripped by the holder and projecting from the forward end thereof, a welding circuit in which the electrode and the work may be connected whereby a welding arc may be established between the electrode and the work, a support for the electrode holder relative to which the holder is longitudinally movable, stop means limiting the rearward movement of the electrode holder relative to the support, spring means normally biasing the electrode holder to the limit of its rearward movement, and means for advancing the electrode holder relative to the support to bring the tip of the electrode into contact with the work, said means including an electromagnetic coupling having a field part provided with a magnetizing coil and another part made of magnetic material and constituting an armature, a source of electrical energy for energizing said coil, one of said parts of the coupling being movable longitudinally of and relative to the electrode holder, manually operable means for advancing such part from its normal position, the other or second part of the coupling being operatively connected with the electrode holder and when said coil is energized being magnetically attracted to the first part and movable from its normal position therewith to thereby advance the electrode holder, said coil being connected in the welding circuit so that it is de-energized when the electrode contacts with the work whereby said spring means then moves said second part of the coupling rearwardly away from the first part to its normal position to thereby retract the electrode holder to the limit of its rearward movement, means for providing energy in opposition to the self-induced energy in the coil when it is de-energized upon contact of the electrode with the work to thereby insure quick uncoupling of the two parts of the coupling, and spring means for returning the first part of the coupling to its normal position when permitted to do so by said manually operable means.

8. In arc welding apparatus, an electrode holder, an electrode gripped by the holder and projecting from the forward end thereof, a welding circuit in which the electrode and the work may be connected whereby a welding arc may be established between the electrode and the work, a support for the electrode holder relative to which the holder is longitudinally movable, stop means limiting the rearward movement of the electrode holder relative to the support, spring means normally biasing the electrode holder to the limit of its rearward movement, and means for advancing the electrode holder relative to the support to bring the tip of the electrode into contact with the work, said means including an electromagnetic coupling having a field part provided with a magnetizing coil and another part made of magnetic material and constituting an armature, a source of electrical energy for energizing said coil, one of said parts of the coupling being movable longitudinally of and relative to the electrode holder, manually operable means for advancing such part from its normal position, the other or second part of the coupling being operatively connected with the electrode holder and when said coil is energized being magnetically attracted to the first part and movable from its normal position therewith to thereby advance the electrode holder, said coil being connected in the welding circuit so that the supply of current to it from said source is substantially interrupted when the electrode contacts with the work whereby said spring means then moves said second part of the coupling rearwardly away from the first part to its normal position to thereby retract the electrode holder to the limit of its rearward movement, an R. C. circuit comprising a resistance and a condenser connected in series with the coil of the coupling so that the condenser is charged when current passes through the coil from said source of electrical energy, said condenser and resistance having values such as to produce a reverse flow of current through the coil of the coupling when the flow of current to the coil from said source is interrupted upon contact of the electrode with the work thereby insuring quick uncoupling of the two parts of the coupling, and spring means for returning the first part of the coupling to its normal position when permitted to do so by said manually operable means.

9. Arc welding apparatus in accordance with claim 4 having means for supplying a shielding gas to the welding region, means for starting and stopping the supply of shielding gas, and means controlled by said last-named means for rendering said electro-magnetic coupling ineffective when the supply of shielding gas is shut off.

10. Arc welding apparatus in accordance with claim 4 having means for supplying a cooling fluid to the electrode holder, means for starting and stopping the supply of the cooling fluid, and means controlled by said last-named means for rendering said electro-magnetic coupling ineffective when the supply of cooling fluid is shut off.

11. Arc welding apparatus according to claim 7 in which the means for providing energy in opposition to the self-induced energy in the coil comprises auxiliary energy storage means having a capacity sufficient to cause neutralization or elimination of the residual magnetism in the magnetic material of the armature when the coil is deenergized.

12. Arc spot welding apparatus comprising an electrode holder supported for movement toward and away from a workpiece to be welded, an electrode gripped by said electrode holder, means biasing said electrode holder in a direction away from said work, means including an electromagnetic coupling for advancing said electrode holder against said biasing means, when the electromagnet of said electromagnetic coupling means is energized, to bring said electrode into contact with said work, and means responsive to the change in electrical conditions when said electrode contacts said work to deenergize the electromagnet of said electromagnetic coupling means and render said electrode holder advancing means inoperative.

13. Arc welding apparatus comprising an electrode holder, an electrode held thereby, means normally exerting a biasing force on the electrode holder in a direction tending to maintain the electrode retracted from the work, means for advancing the electrode holder to bring the end of the electrode into contact with the work against the force of said biasing means, means operating when the electrode contacts with the work to effect retraction of the electrode holder by said biasing means, means having two operable positions in one of which it permits initiation of and in the other of which it terminates a flow of a shielding gas to the region of the arc and a flow of cooling fluid to the apparatus to cool the electrode holder, and means controlled by the last-named means for rendering said electrode holder advancing means inoperative until said last-named means is in operable position to permit initiation of the flows of gas and cooling fluid.

14. Arc welding apparatus comprising an electrode holder, an electrode held thereby, means normally exerting biasing force on the electrode holder in a direction tending to maintain the electrode retracted from the work, means for advancing the electrode holder to bring the end of the electrode into contact with the work against the force of said biasing means, means operating when the electrode contacts with the work to effect retraction of the electrode holder by said biasing means, means having two operable positions in one of which it permits initiation of and in the other of which it terminates a flow of a shielding gas to the region of the arc, and means controlled by the last-named means for rendering said electrode holder advancing means inoperative until said last-named means is in operable position to permit initiation of the flow of gas.

References Cited in the file of this patent

UNITED STATES PATENTS

| | | |
|---|---|---|
| 1,763,007 | Petzing | June 10, 1930 |
| 1,914,214 | Price | June 13, 1933 |
| 2,317,888 | Cypser | Apr. 27, 1943 |
| 2,457,011 | Tubbs | Dec. 21, 1948 |
| 2,464,935 | Leathers | Mar. 22, 1949 |
| 2,510,415 | Pitcher | June 6, 1950 |
| 2,517,739 | Tyrner | Aug. 8, 1950 |
| 2,550,495 | Pilia | Apr. 24, 1951 |

FOREIGN PATENTS

| | | |
|---|---|---|
| 461,203 | Great Britain | Feb. 12, 1937 |